(12) United States Patent
Takahashi et al.

(10) Patent No.: US 9,701,761 B2
(45) Date of Patent: Jul. 11, 2017

(54) POLYMER MODIFYING AGENT COMPOSITION, MODIFIED POLYMER, RUBBER COMPOSITION AND TIRE

(71) Applicant: THE YOKOHAMA RUBBER CO., LTD., Minato-Ku, Tokyo (JP)

(72) Inventors: Ryota Takahashi, Hiratsuka (JP); Manabu Kato, Hiratsuka (JP); Takahiro Okamatsu, Hiratsuka (JP); Yoshiaki Kirino, Hiratsuka (JP); Hisae Takano, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/114,489

(22) PCT Filed: Dec. 22, 2014

(86) PCT No.: PCT/JP2014/083990
§ 371 (c)(1),
(2) Date: Jul. 27, 2016

(87) PCT Pub. No.: WO2015/114999
PCT Pub. Date: Aug. 6, 2015

(65) Prior Publication Data
US 2016/0347870 A1    Dec. 1, 2016

(30) Foreign Application Priority Data

Jan. 31, 2014 (JP) ................. 2014-016761
May 20, 2014 (JP) ................. 2014-104394

(51) Int. Cl.
| | |
|---|---|
| *C08C 19/22* | (2006.01) |
| *B60C 1/00* | (2006.01) |
| *C08L 9/06* | (2006.01) |
| *C08K 3/00* | (2006.01) |
| *C08F 8/30* | (2006.01) |
| *C08K 5/00* | (2006.01) |
| *C08L 15/00* | (2006.01) |
| *C08K 5/09* | (2006.01) |
| *C08K 5/32* | (2006.01) |

(52) U.S. Cl.
CPC ............. *C08C 19/22* (2013.01); *B60C 1/00* (2013.01); *B60C 1/0016* (2013.04); *C08F 8/30* (2013.01); *C08K 3/00* (2013.01); *C08K 3/0033* (2013.01); *C08K 5/00* (2013.01); *C08L 9/06* (2013.01); *C08L 15/00* (2013.01); *C08K 5/09* (2013.01); *C08K 5/32* (2013.01); *C08L 2205/025* (2013.01)

(58) Field of Classification Search
CPC .......................................... C08C 19/22
USPC .......................................... 523/155
See application file for complete search history.

(56) References Cited

U.S. PATENT DOCUMENTS

| | | |
|---|---|---|
| 3,792,031 A | 2/1974 | Udding |
| 4,912,186 A | 3/1990 | Ohhara et al. |
| 2010/0132868 A1* | 6/2010 | Hergenrother ....... C08K 3/0033 152/564 |
| 2011/0224351 A1 | 9/2011 | Mori et al. |
| 2015/0322190 A1 | 11/2015 | Takahashi et al. |

FOREIGN PATENT DOCUMENTS

| | | |
|---|---|---|
| JP | 48-16996 A | 3/1973 |
| JP | H01-252609 A | 10/1989 |
| JP | H06-035176 A | 2/1994 |
| JP | 2007-224068 * | 9/2007 |
| JP | 2008-163232 A | 7/2008 |
| JP | 2008-208163 A | 9/2008 |
| WO | 2010/038835 A1 | 4/2010 |
| WO | 2014/077364 A1 | 5/2014 |

OTHER PUBLICATIONS

Machine translation of JP 2007-224068.*

* cited by examiner

*Primary Examiner* — Doris Lee
(74) *Attorney, Agent, or Firm* — Carrier Blackman & Associates, P.C.; Joseph P. Carrier; Anne G. Sabourin

(57) ABSTRACT

The present invention is to provide a polymer modifying agent composition which provides a modified polymer that exhibits excellent low heat build-up when formed into a vulcanized product. The polymer modifying agent composition is a polymer modifying agent composition modifying a polymer having a carbon-carbon unsaturated bond, and containing (A) a nitrone having at least one carboxy group and (B) a fatty acid having 6 or more carbons.

7 Claims, 1 Drawing Sheet

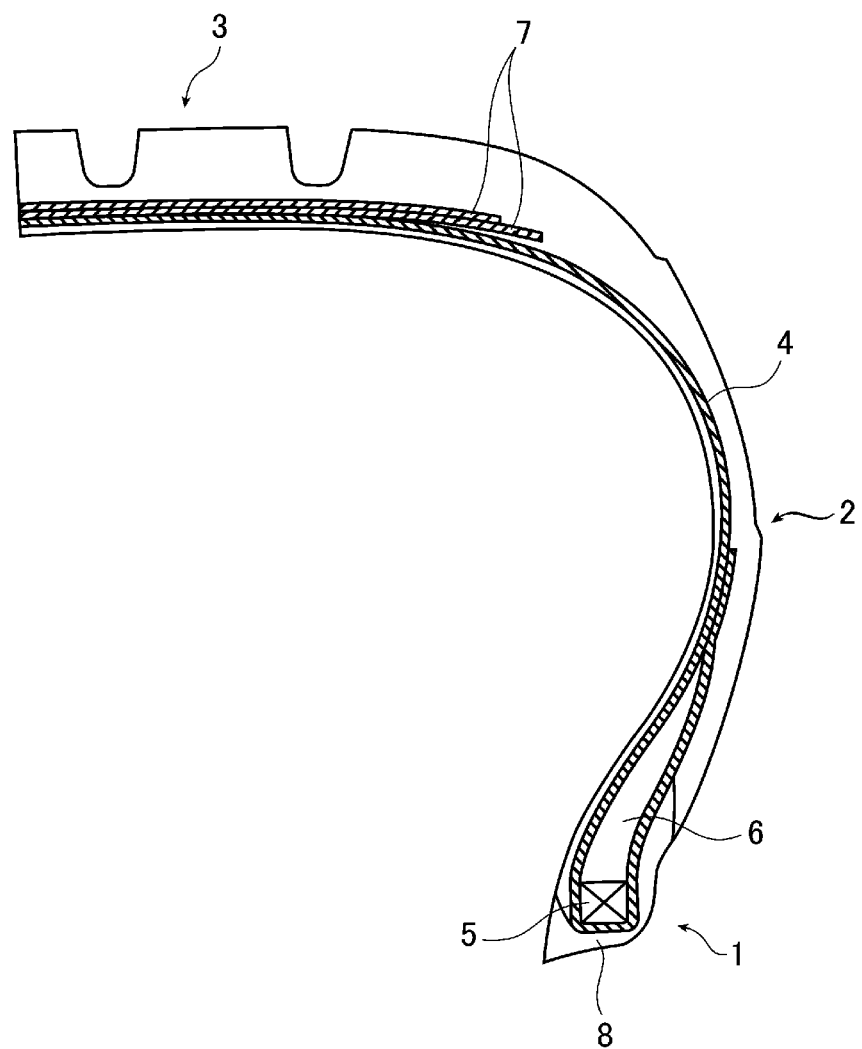

US 9,701,761 B2

POLYMER MODIFYING AGENT COMPOSITION, MODIFIED POLYMER, RUBBER COMPOSITION AND TIRE

TECHNICAL FIELD

The present invention relates to a polymer modifying agent composition, a modified polymer, a rubber composition, and a tire.

BACKGROUND ART

Modified polymers that are modified with a nitrone having a carboxy group have been known conventionally as polymers contained in rubber compositions (see Patent Document 1).

CITATION LIST

Patent Literature

Patent Document 1: Japanese Unexamined Patent Application Publication No. 548-016996A

SUMMARY OF INVENTION

Technical Problem

Higher levels of characteristics of tires or the like, which are vulcanized products, have been required in recent years.

The inventors of the present invention have researched vulcanized products of rubber compositions containing a modified polymer that is modified with a nitrone containing a carboxy group.

As a result, vulcanized products in which a modified polymer modified with a nitrone having no carboxy group (e.g. pyridylnitrone) is used exhibit relatively good value of tan δ (60° C.), which is an indicator of low heat build-up; however, there are cases where the characteristics thereof are insufficient as the characteristics required in recent years.

Note that, for tan δ (60° C.) which is a loss tangent (loss factor), a smaller value is evaluated as exhibiting low heat build-up and low rolling resistance.

The present invention has been completed in light of the points described above, and an object of the present invention is to provide a polymer modifying agent composition which provides a modified polymer that exhibits excellent low heat build-up when formed into a vulcanized product.

Solution to Problem

The present inventors have conducted dedicated research to achieve the above object. As a result, the inventors has found that the value of tan δ (60° C.) can be made excellent in a vulcanized product in which a modified polymer that is modified using a nitrone having a carboxy group and a specific fatty acid is used, and thus completed the present invention.

Specifically, the present invention provides the following (1) to (8).

(1) A polymer modifying agent composition that modifies a polymer having a carbon-carbon unsaturated bond, the polymer modifying agent composition comprising (A) a nitrone having at least one carboxy group and (B) a fatty acid having 6 or more carbons.

(2) The polymer modifying agent composition according to (1) described above, in which the nitrone (A) is a nitrone represented by Formula (a) described below.

(3) The polymer modifying agent composition according to (2) described above, in which the nitrone (A) is at least one type of nitrone selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

(4) A modified polymer obtained by modifying an unmodified polymer with the polymer modifying agent composition described in any one of (1) to (3) described above.

(5) The modified polymer according to (4) described above, in which the unmodified polymer is a diene-based rubber component.

(6) The modified polymer according to (5) described above, in which the diene-based rubber component is at least one type selected from the group consisting of a natural rubber, isoprene rubber, styrene-butadiene rubber, and butadiene rubber.

(7) A rubber composition comprising the modified polymer described in any one of (4) to (6) described above, and an additive.

(8) A tire comprising the rubber composition described in (7) described above.

Advantageous Effects of Invention

According to the present invention, a polymer modifying agent composition which provides a modified polymer that exhibits excellent low heat build-up when formed into a vulcanized product can be provided.

BRIEF DESCRIPTION OF DRAWINGS

FIG. 1 is a partial cross-sectional schematic view of a tire that represents one embodiment of the tire of the present invention.

DESCRIPTION OF EMBODIMENT

Polymer Modifying Agent Composition

The polymer modifying agent composition of the present invention is a polymer modifying agent composition that modifies a polymer having a carbon-carbon unsaturated bond, and the polymer modifying agent composition contains (A) a nitrone having at least one carboxy group and (B) a fatty acid having 6 or more carbons.

When a case where a modified polymer is modified only with a nitrone (A) having a carboxy group and a case where a modified polymer is modified with the polymer modifying agent composition of the present invention are compared, the latter modified polymer results in smaller value of tan δ (60° C.) of the vulcanized product and thus exhibits excellent low heat build-up.

It is conceived that the former case is because the carboxy group of the nitrone (A) associates with a carboxy group of another nitrone (A), and thus the carboxy groups are less likely to interact with an additive, such as silica, in the vulcanized product.

On the other hand, it is conceived that the latter case is because association between the carboxy group of the fatty acid (B) and the carboxy group of the nitrone (A) is prioritized but the association easily dissociates, and thus the carboxy group of the nitrone (A) easily interacts with an additive, such as silica.

However, the mechanism described above is a presumption, and other mechanisms are also included in the scope of the present invention.

Nitrone (A)

The nitrone (A) used in the present invention is not particularly limited as long as the nitrone (A) is a nitrone having at least one carboxy group (—COOH) (hereinafter, also referred to as "carboxynitrone" for convenience); however, for example, a carboxynitrone represented by formula (a) below is suitably used. Note that "nitrone" is a generic term for compounds in which an oxygen atom is bonded to a nitrogen atom of a Schiff base.

[Chemical Formula 1]

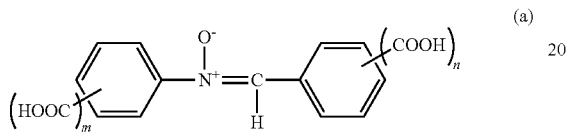
(a)

In Formula (a), m and n each independently represent an integer of 0 to 5, and a sum of m and n is 1 or greater.

The integer represented by m is preferably an integer of 0 to 2, and more preferably an integer of 0 or 1, because solubility to a solvent during nitrone synthesis will be better and thus synthesis will be easier.

The integer represented by n is preferably an integer of 0 to 2, and more preferably an integer of 0 or 1, because solubility to a solvent during nitrone synthesis will be better and thus synthesis will be easier.

Furthermore, the sum of m and n (m+n) is preferably from 1 to 4, and more preferably 1 or 2, because solubility to a polymer will be better and thus reactivity will be excellent.

As the carboxynitrone represented by Formula (a) is preferably at least one type of nitrone selected from the group consisting of N-phenyl-α-(4-carboxyphenyl)nitrone represented by Formula (a1) below, N-phenyl-α-(3-carboxyphenyl)nitrone represented by Formula (a2) below, N-phenyl-α-(2-carboxyphenyl)nitrone represented by Formula (a3) below, N-(4-carboxyphenyl)-α-phenylnitrone represented by Formula (a4) below, N-(3-carboxyphenyl)-α-phenylnitrone represented by Formula (a5) below, and N-(2-carboxyphenyl)-α-phenylnitrone represented by Formula (a6) below, from the perspective of achieving high reactivity and excellent productivity as well as achieving even better low heat build-up when the modified polymer modified with the polymer modifying agent composition of the present invention is used to form a vulcanized product.

[Chemical Formula 2]

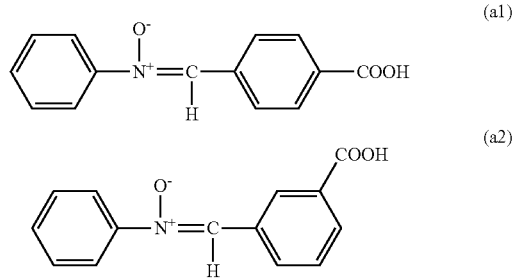

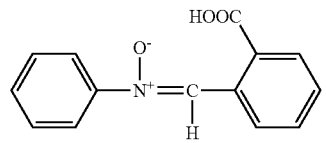

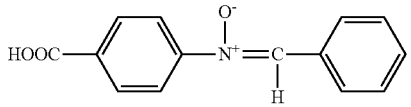

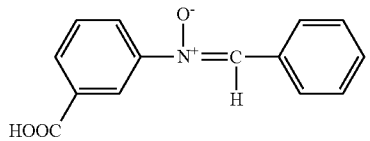

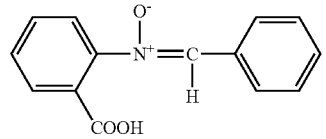

Note that the synthesizing method of the nitrone (A) is not particularly limited, and a conventionally known method can be used. For example, nitrones having a nitrone group represented by Formula —N$^+$(—O$^-$)=CH— are obtained by stirring a compound having a hydroxyamino group (—NHOH) and a compound having an aldehyde group (—CHO) at a molar ratio of the hydroxyamino group to the aldehyde group (—NHOH/—CHO) of 1.0 to 1.5 in the presence of an organic solvent (e.g. methanol, ethanol, tetrahydrofuran, and the like) at room temperature for 1 to 24 hours to allow the both groups to react. At this time, by allowing one of the two compounds to have a carboxy group, the nitrone (A) having at least one carboxy group can be obtained.

Fatty Acid (B)

The fatty acid (B) used in the present invention is not particularly limited as long as the fatty acid (B) is a fatty acid having 6 or more carbons, and the fatty acid (B) may be in a straight chain or branched chain and may be saturated or unsaturated.

The number of carbons of the fatty acid (B) is preferably from 12 to 26, more preferably from 14 to 24, and even more preferably from 16 to 22, since effect to operators is small because volatilization is less likely to occur when the unmodified polymer is modified with the polymer modifying agent composition of the present invention, and since effect of reducing tan δ (60° C.) is even better.

Specific examples of the straight-chain saturated fatty acid include hexanoic acid (caproic acid; number of carbons: 6), octanoic acid (caprylic acid; number of carbons: 8), decanoic acid (capric acid; number of carbons: 10), dodecanoic acid (lauric acid; number of carbons: 12), tetradecanoic acid (myristic acid; number of carbons: 14), hexadecanoic acid (palmitic acid; number of carbons: 16), heptadecanoic acid (margaric acid; number of carbons: 17), octadecanoic acid (stearic acid; number of carbons: 18), eicosanoic acid (arachidic acid; number of carbons: 20), docosanoic acid (behenic acid; number of carbons: 22), tetracosanoic acid (lignoceric acid; number of carbons: 24), hexacosanoic acid (cerotic acid; number of carbons: 26), and the like.

Specific examples of the branched-chain saturated fatty acid include 14-ethylhexadecanoic acid (number of carbons: 18), 2-butyltetradecanoic acid (number of carbons: 18), 17-methyloctadecanoic acid (number of carbons: 19), and the like.

Specific examples of the unsaturated fatty acid include palmitoleic acid (number of carbons: 16), oleic acid (number of carbons: 18), linolic acid (number of carbons: 18), α-linolenic acid (number of carbons: 18), γ-linolenic acid (number of carbons: 18), arachidonic acid (number of carbons: 20), stearolic acid (number of carbons: 18), and the like.

Among these, since unsaturated fatty acids have reactivity to the nitrone (A), straight-chain or branched-chain saturated fatty acids are preferable. From the perspective of availability, straight-chain saturated fatty acids are more preferable.

Molar Ratio of Fatty Acid (B) to Nitrone (A) (B/A)

The polymer modifying agent composition of the present invention can be obtained by mixing the nitrone (A) and the fatty acid (B), and at this time, the molar ratio of the fatty acid (B) to the nitrone (A) (B/A) is, for example, from 0.1 to 40. From the perspective of achieving even better effect of reducing tan δ (60° C.), the molar ratio is preferably from 0.2 to 35, and more preferably from 0.5 to 30.

Modified Polymer

The modified polymer of the present invention is a modified polymer that is modified with the polymer modifying agent composition of the present invention, and specifically, the modified polymer of the present invention is obtained by modifying an unmodified polymer using the polymer modifying agent composition of the present invention.

Unmodified Polymer

The unmodified polymer used in the present invention is a polymer having a carbon-carbon unsaturated bond because of the modifying mechanism of nitrone described below. "Carbon-carbon unsaturated bond" refers to carbon-carbon double bonds (C=C) and/or carbon-carbon triple bonds (C≡C). The unmodified polymer may has such an unsaturated bond in the main chain or in a side chain, for example, as a vinyl group.

Note that "unmodified" refers to a state that is not modified with a nitrone, and the word "unmodified" does not exclude polymers that have been modified with other components.

Examples of such an unmodified polymer include diene-based rubber components that are vulcanizable. Specific examples thereof include a natural rubber (NR), isoprene rubber (IR), butadiene rubber (BR), chloroprene rubber (CR), butyl rubber (IIR), styrene-butadiene rubber (SBR), acrylonitrile rubber (NBR), hydrogenated nitrile rubber (H—NBR), ethylene-propylene-diene rubber (EPDM), and the like. One type of these unmodified polymers may be used alone, or two or more types of these may be used in combination.

Among these, the unmodified polymer is preferably at least one type selected from the group consisting of a natural rubber (NR), isoprene rubber (IR), styrene-butadiene rubber (SBR), and butadiene rubber (BR).

Method of Producing Modified Polymer

An example of the method of producing the modified polymer of the present invention is a method in which the unmodified polymer described above and the polymer modifying agent composition of the present invention containing a nitrone (A) and a fatty acid (B) are mixed at, for example, 150 to 200° C. for 1 to 30 minutes to obtain the modified polymer of the present invention.

In this case, for example, a five-membered ring is obtained due to cycloaddition reaction that occurs between an unsaturated bond contained in the unmodified polymer and a nitrone group contained in the nitrone (A), as described in Formula (1) below.

[Chemical Formula 3]

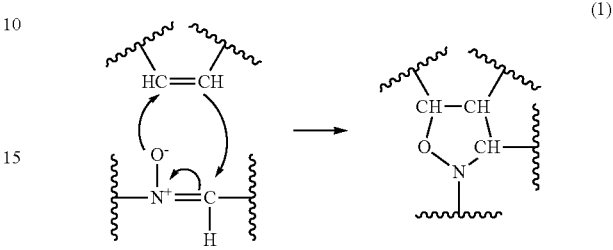

(1)

Furthermore, for example, when the side chain of the unmodified polymer has a vinyl group as the unsaturated bond, a five-membered ring is obtained due to cycloaddition reaction that occurs between the vinyl group and the nitrone group, as described in Formula (2) below.

[Chemical Formula 4]

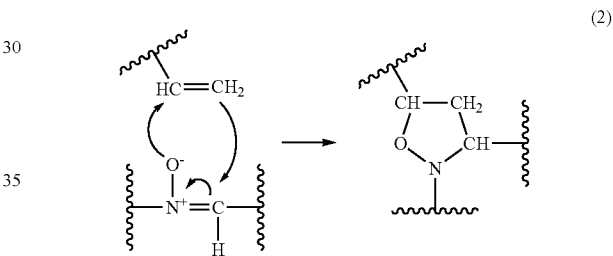

(2)

It is thus conceived that, along with the reactions described in Formula (1) and Formula (2), the carboxy group derived from the nitrone (A) and the carboxy group contained in the fatty acid (B) are associated.

The amount of the nitrone (A) that is reacted with the unmodified polymer described above is preferably from 0.1 to 10 parts by mass, and more preferably from 0.3 to 5 parts by mass, per 100 parts by mass of the unmodified polymer from the perspective of exhibiting better effect of reducing tan δ (60° C.)

Furthermore, when the modified polymer of the present invention is obtained, the modification ratio of the unsaturated bond is preferably from 0.01 to 2.0 mol %, and more preferably from 0.02 to 1.5 mol %.

Reaction efficiency of the nitrone is preferably from 20 to 100 mol %, and more preferably from 40 to 100 mol %.

Note that the modification ratio of the unsaturated bond is a proportion (unit: mol %) of number of moles of unsaturated bonds modified by the nitrone (A) to the total number of moles of the unsaturated bonds contained in the unmodified polymer, and can be determined by NMR analysis of the unmodified polymer and the modified polymer (that is, the polymer before and after the modification).

Furthermore, the reaction efficiency of the nitrone is a proportion (unit: mol %) of the number of moles of the nitrone (A) reacted with the unsaturated bonds of the unmodified polymer relative to the total number of moles of the nitrone (A) blended to the unmodified polymer.

Preferred Embodiment of Modified Polymer

Since the carboxynitrone represented by Formula (a) is preferably used as the nitrone (A) as described above, the modified polymer of the present invention preferably has a five-membered ring structure represented by Formula (I) below derived from the nitrone (A) represented by Formula (a). Note that, in Formula (I), m and n are synonymous with m and n in Formula (a) described above.

Also in the modified polymer of the present invention, it is conceived that the carboxy groups of the fatty acid (B) are associated with at least some of the carboxy groups derived from the nitrone (A) represented by Formula (a).

[Chemicl Formula 5]

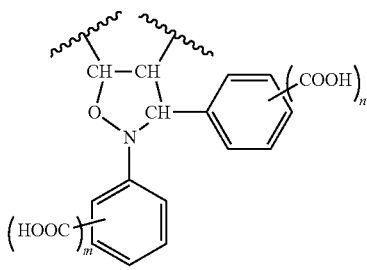

(I)

Rubber Composition

The rubber composition of the present invention is a rubber composition containing the modified polymer of the present invention and an additive.

Examples of the additives include various additives that are ordinarily used in rubber compositions such as silane coupling agents, fillers (e.g. silica, carbon black, and the like), zinc oxide, stearic acid, antiaging agents, processing aids, various oils, plasticizers (e.g. polyhydric alcohol, benzoic acid esters, phthalic acid esters, and the like), liquid polymers, terpene resins, thermosetting resins, vulcanizing agents, and vulcanization accelerators.

The compounded amount of the additives described above is not particularly limited and can be appropriately selected. For example, in the case of fillers such as silica, the compounded amount thereof is from 10 to 100 parts by mass per 100 parts by mass of the modified polymer of the present invention; however, the compounded amount is not limited to this.

The method of producing the rubber composition of the present invention is not particularly limited, and examples thereof include a method whereby the above-mentioned components are kneaded using a publicly known method and device (e.g. Banbury mixer, kneader, roller, and the like) at 60 to 145° C. for 1 to 30 minutes.

Furthermore, the rubber composition of the present invention can be vulcanized under conventionally known vulcanizing conditions to form a vulcanized product.

The application of the rubber composition of the present invention is not particularly limited; however, since the vulcanized product that uses the modified polymer of the present invention exhibits excellent low heat build-up, the rubber composition of the present invention can be suitably used as compositions for use in tires, more specifically compositions for use in tire treads.

Tire

The tire (pneumatic tire) of the present invention is a pneumatic tire that is produced using the rubber composition of the present invention described above. In particular, the tire (pneumatic tire) of the present invention is preferably a pneumatic tire that is produced using the rubber composition of the present invention in the tire tread.

FIG. 1 is a partial cross-sectional schematic view of a tire that represents one embodiment of the pneumatic tire of the present invention, but the pneumatic tire of the present invention is not limited to the embodiment illustrated in FIG. 1.

In FIG. 1, reference number 1 denotes a bead portion, reference number 2 denotes a sidewall portion, and reference number 3 denotes a tire tread portion.

A carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Rim cushions 8 are provided in parts of the bead portions 1 that are in contact with a rim.

The pneumatic tire of the present invention can be produced, for example, in accordance with conventionally known methods. In addition to ordinary air or air with an adjusted oxygen partial pressure, inert gasses such as nitrogen, argon, and helium can be used as the gas with which the tire is filled.

EXAMPLES

The present invention is described below in detail using examples, but is in no way limited to these examples.

Production of Modified Olymer

To 100 parts by mass of BR (Nipol BR 1220, manufactured by Zeon Corporation) which was an unmodified polymer, 137.5 parts by mass of SBR (Tufdene E580, manufactured by Asahi Kasei Chemicals Corporation; amount of oil extension relative to 100 parts by mass of rubber component: 37.5 parts by mass), and 100 parts by mass of NR (RSS#3) or 100 parts by mass of IR (Nipol IR2200, manufactured by Zeon Corporation), only N-phenyl-α-(4-carboxyphenyl)nitrone (CPN), which was a nitrone (A), alone or the CPN and stearic acid (StA), which was a fatty acid (B), were blended at proportion(s) described in Table 1 or Table 2 below and mixed using a Banbury mixer at 160° C. for 5 minutes to obtain a modified polymer. Note that, when StA was not used, "-" is written in the corresponding parts of Table 1 and Table 2 below.

For the obtained modified polymer, the modification ratio of the unsaturated bonds and the reaction efficiency of the nitrone described above were measured. The results of these measurements are also shown in Table 1 and Table 2 below.

For the modification ratio of the unsaturated bonds, specifically, the modification ratio was calculated by measuring the peak area around 8.08 ppm (assigned to two protons adjacent to a carboxy group) for the polymer before and after the modification by $^1$H-NMR analysis using $CDCl_3$ as a solvent ($CDCl_3$, 400 MHz, TMS). Note that the $^1$H-NMR analysis of the polymer after the modification (modified polymer) was performed by dissolving the product after the modification in toluene, repeating purification, in which the product was precipitated in methanol, twice, and then drying the sample under reduced pressure to use the sample for the measurement.

TABLE 1

| | BR | | | SBR | | |
|---|---|---|---|---|---|---|
| | CPN-modified | CPN + StA-modified | CPN-modified | CPN + StA-modified 1 | 2 | 3 |
| (A) CPN [part by mass] | 1.0 | 1.0 | 1.0 | 1.0 | 1.0 | 0.1 |
| (B) StA [part by mass] | — | 1.7 | — | 1.7 | 6.7 | 3.0 |
| Molar ratio (B/A) | — | 1.44 | — | 1.44 | 5.68 | 25.44 |
| Modification ratio of unsaturated bond [mol %] | 0.10 | 0.10 | 0.28 | 0.27 | 0.29 | 0.03 |
| Reaction efficiency of nitrone [mol %] | 46.1 | 43.3 | 81.2 | 78.3 | 84.1 | 95.7 |

TABLE 2

| | NR | | | | | IR | | | | |
|---|---|---|---|---|---|---|---|---|---|---|
| | CPN-modified | CPN + StA-modified 1 | 2 | 3 | 4 | CPN-modified | CPN + StA-modified 1 | 2 | 3 | 4 |
| (A) CPN [part by mass] | 1.0 | 1.0 | 1.0 | 1.0 | 1.0 | 1.0 | 1.0 | 1.0 | 1.0 | 1.0 |
| (B) StA [part by mass] | — | 0.9 | 1.7 | 8.5 | 40.0 | — | 0.9 | 1.7 | 8.5 | 40.0 |
| Molar ratio (B/A) | — | 0.76 | 1.44 | 7.21 | 33.92 | — | 0.76 | 1.44 | 7.21 | 33.92 |
| Modification ratio of unsaturated bond [mol %] | 0.01 | 0.02 | 0.06 | 0.07 | 0.08 | 0.01 | 0.02 | 0.05 | 0.06 | 0.07 |
| Reaction efficiency of nitrone [mol %] | 5.0 | 7.8 | 19.9 | 24.5 | 27.7 | 4.5 | 6.8 | 17.8 | 22.2 | 25.1 |

As is clear from the results shown in Table 2 above, when the stearic acid (StA) was used during the modification of the natural rubber (NR) or the isoprene rubber (IR), the reaction efficiency of the nitrone was enhanced compared to the case where the stearic acid (StA) was not used.

Comparative Examples 1 to 5 and Working Examples 1 to 7

The components shown in the Table 3 or Table 4 below were blended at the proportions (part by mass) shown in the same table.

Specifically, the components, excluding the sulfur and the vulcanization accelerator, were charged and mixed using a Banbury mixer at 80° C. for 5 minutes. Thereafter, the sulfur and the vulcanization accelerator were mixed thereto using a roller to obtain a rubber composition. The obtained rubber composition was then vulcanized to obtain a vulcanized product. The vulcanization was performed by press vulcanization (160° C.×20 minutes).

Evaluation of Modified Polymer

In each example, the following evaluations were performed for the obtained modified polymer and vulcanized product. The results are shown in Table 3 and Table 4 below.

Tensile Properties

For each example, vulcanization was performed as described above to form a sheet with a thickness of 2 mm. A No. 3 dumbbell-shaped test piece was cut out from the sheet, and tensile test was conducted in accordance with JIS K6251 at a pulling speed of 500 mm/minute. The 300% modulus ($M_{300}$; unit: MPa), tensile strength ($T_B$; unit: MPa), and elongation at break ($E_B$; unit: %) were measured at room temperature.

In Table 3 below, the results are shown as index values taking the value of the measurement result for Comparative Example 1 as 100. Furthermore, for Comparative Example 4 and Working Examples 4 and 5 in Table 4 below, the results are shown as index values taking the value of the measurement result for Comparative Example 4 as 100. For Comparative Example 5 and Working Examples 6 and 7 in Table 4 below, the results are shown as index values taking the value of the measurement result for Comparative Example 5 as 100. The sample is evaluated as having superior tensile properties when the index value is greater.

Tan δ (0° C.)

The loss tangent at a temperature of 0° C., tan δ (0° C.), was measured for the obtained vulcanized product in each example using a viscoelastic spectrometer (manufactured by Toyo Seiki Seisaku-sho, Ltd.) under the following conditions: 10% initial distortion, ±2% amplitude, and 20 Hz frequency.

In Table 3 below, the results are shown as index values taking the value of the measurement result for Comparative Example 1 as 100. Furthermore, for Comparative Example 4 and Working Examples 4 and 5 in Table 4 below, the results are shown as index values taking the value of the measurement result for Comparative Example 4 as 100. For Comparative Example 5 and Working Examples 6 and 7 in Table 4 below, the results are shown as index values taking the value of the measurement result for Comparative Example 5 as 100. The sample is evaluated as having superior wet grip performance when the index value is greater (i.e. value of tan δ (0° C.) is greater).

Tan δ (60° C.)

The loss tangent at a temperature of 60° C., tan δ (60° C.), was measured for the obtained vulcanized product in each example using a viscoelastic spectrometer (manufactured by Toyo Seiki Seisaku-sho, Ltd.) under the following conditions: 10% initial distortion, ±2% amplitude, and 20 Hz frequency.

In Table 3 below, the results are shown as index values taking the value of the measurement result for Comparative Example 1 as 100. Furthermore, for Comparative Example 4 and Working Examples 4 and 5 in Table 4 below, the results are shown as index values taking the value of the measurement result for Comparative Example 4 as 100. For Comparative Example 5 and Working Examples 6 and 7 in Table 4 below, the results are shown as index values taking the value of the measurement result for Comparative Example 5 as 100. The sample is evaluated as having superior low heat build-up and superior rolling resistance when the index value is smaller (i.e. value of tan δ (60° C.) is smaller).

TABLE 3

| | | Comparative Example | | Working Example | Comparative Example | Working Example | |
|---|---|---|---|---|---|---|---|
| | | 1 | 2 | 1 | 3 | 2 | 3 |
| BR | BR | 30.00 | | | 30.00 | 30.00 | |
| | CPN-modified | | 30.00 | | | | |
| | CPN + StA-modified | | | 30.50 | | | |
| SBR | SBR | 96.25 | 96.25 | 96.25 | 55.00 | 55.00 | 55.00 |
| | CPN-modified | | | | 41.25 | | |
| | CPN + StA-modified 1 | | | | | 41.75 | |
| | CPN + StA-modified 3 | | | | | | 43.75 |
| | Silica | 30.00 | 30.00 | 30.00 | 30.00 | 30.00 | 70.00 |
| | Carbon black | 30.00 | 30.00 | 30.00 | 30.00 | 30.00 | 5.00 |
| | Zinc oxide | 3.00 | 3.00 | 3.00 | 3.00 | 3.00 | 3.00 |
| | Stearic acid | 2.00 | 2.00 | 1.50 | 2.00 | 1.50 | 0.00 |
| | Antiaging agent | 1.50 | 1.50 | 1.50 | 1.50 | 1.50 | 1.50 |
| | Silane coupling agent | 2.00 | 2.00 | 2.00 | 2.00 | 2.00 | 5.60 |
| | Process oil | 10.00 | 10.00 | 10.00 | 10.00 | 10.00 | 10.00 |
| | Sulfur | 1.60 | 1.60 | 1.60 | 1.60 | 1.60 | 1.50 |
| | Vulcanization accelerator (CZ) | 1.80 | 1.80 | 1.80 | 1.80 | 1.80 | 1.70 |
| | Vulcanization accelerator (DPG) | 0.70 | 0.70 | 0.70 | 0.70 | 0.70 | 2.00 |
| | $M_{300}$ | 100 | 100 | 98 | 115 | 117 | 116 |
| | $T_B$ | 100 | 94 | 100 | 108 | 107 | 108 |
| | $E_B$ | 100 | 97 | 103 | 97 | 94 | 96 |
| | tan δ (0° C.) | 100 | 79 | 79 | 89 | 88 | 86 |
| | tan δ (60° C.) | 100 | 78 | 70 | 80 | 60 | 55 |

TABLE 4

| | | Comparative Example | Working Example | | Comparative Example | Working Example | |
|---|---|---|---|---|---|---|---|
| | | 4 | 4 | 5 | 5 | 6 | 7 |
| NR | NR | 100.00 | | | | | |
| | CPN + StA-modified 1 | | 101.90 | | | | |
| | CPN + StA-modified 3 | | | 109.50 | | | |
| IR | IR | | | | 100.00 | | |
| | CPN + StA-modified 1 | | | | | 101.90 | |
| | CPN + StA-modified 3 | | | | | | 109.50 |
| | Silica | 70.00 | 70.00 | 70.00 | 70.00 | 70.00 | 70.00 |
| | Zinc oxide | 3.00 | 3.00 | 3.00 | 3.00 | 3.00 | 3.00 |
| | Stearic acid | 2.00 | 1.10 | | 2.00 | 1.10 | |
| | Antiaging agent | 1.50 | 1.50 | 1.50 | 1.50 | 1.50 | 1.50 |
| | Silane coupling agent | 5.60 | 5.60 | 5.60 | 5.60 | 5.60 | 5.60 |
| | Process oil | 10.00 | 10.00 | 10.00 | 10.00 | 10.00 | 10.00 |
| | Sulfur | 1.60 | 1.60 | 1.60 | 1.60 | 1.60 | 1.60 |

TABLE 4-continued

|  | Comparative Example 4 | Working Example 4 | Working Example 5 | Comparative Example 5 | Working Example 6 | Working Example 7 |
|---|---|---|---|---|---|---|
| Vulcanization accelerator (CZ) | 1.80 | 1.80 | 1.80 | 1.80 | 1.80 | 1.80 |
| Vulcanization accelerator (DPG) | 0.70 | 0.70 | 0.70 | 0.70 | 0.70 | 0.70 |
| $M_{300}$ | 100 | 95 | 98 | 100 | 99 | 101 |
| $T_B$ | 100 | 100 | 94 | 100 | 104 | 102 |
| $E_B$ | 100 | 97 | 93 | 100 | 94 | 100 |
| tan δ (0° C.) | 100 | 94 | 92 | 100 | 95 | 94 |
| tan δ (60° C.) | 100 | 94 | 89 | 100 | 96 | 93 |

The details of the components shown in Table 3 and Table 4 above are as follows.

BR: Nipol BR1220 (manufactured by Zeon Corporation)
BR (CPN-modified): material described above (see Table 1)
BR (CPN+StA-modified): material described above (see Table 1)
SBR: Tufdene E580 (amount of oil extension relative to 100 parts by mass of rubber component: 37.5 parts by mass; manufactured by Asahi Kasei Chemicals Corporation)
SBR (CPN-modified): material described above (see Table 1)
SBR (CPN+StA-modified 1): material described above (see Table 1)
SBR (CPN+StA-modified 3): material described above (see Table 1)
NR: RSS#3
NR (CPN+StA-modified 1): material described above (see Table 2)
NR (CPN+StA-modified 3): material described above (see Table 2)
IR: Nipol IR2200 (manufactured by Zeon Corporation)
IR (CPN+StA-modified 1): material described above (see Table 2)
IR (CPN+StA-modified 3): material described above (see Table 2)
Silica: Zeosil 165GR (manufactured by Rhodia Silica Korea Co., Ltd.)
Carbon black: Show Black N339 (manufactured by Cabot Japan K.K.)
Zinc oxide: Type 3 zinc flower (manufactured by Seido Chemical Industry Co., Ltd.)
Stearic acid: Beads stearic acid YR (manufactured by NOF Corporation)
Antiaging agent: Santoflex 6PPD (manufactured by Soltia Europe)
Silane coupling agent: Si69 (manufactured by Evonik Degussa)
Process oil: Extract No. 4S (manufactured by Showa Shell Sekiyu K.K.)
Sulfur: oil-treated sulfur (manufactured by Karuizawa Refinery Ltd.)
Vulcanization accelerator (CZ): Nocceler CZ (manufactured by Ouchi Shinko Chemical Industrial Co., Ltd.)
Vulcanization accelerator (DPG): Soxinol D-G (manufactured by Sumitomo Chemical Co., Ltd.)

In Table 3 above, Comparative Example 1, Comparative Example 2, and Working Example 1 are compared. When Comparative Example 1 in which BR and SBR, which were unmodified polymers, were used is used as the reference, Working Example 1, in which BR (CPN+StA-modified) that was modified with the nitrone (A) and the fatty acid (B) was used, resulted in smaller value of tan δ (60° C.) and thus had superior low heat build-up compared to Comparative Example 2, in which BR (CPN-modified) that was modified with the nitrone (A) alone was used, as well as compared to Comparative Example 1.

Furthermore, when Comparative Example 1, Comparative Example 3, and Working Example 2 are compared, Working Example 2, in which SBR (CPN+StA-modified 1) that was modified with the nitrone (A) and the fatty acid (B) was used, resulted in smaller value of tan δ (60° C.) and thus had superior low heat build-up compared to Comparative Example 3, in which SBR (CPN-modified) that was modified with the nitrone (A) alone was used, as well as compared to Comparative Example 1.

Furthermore, it was found that, when Working Example 2 and Working Example 3 are compared, Working Example 3, in which SBR (CPN+StA-modified 3) having a different molar ratio of the fatty acid (B) to the nitrone (A) (B/A) was used, achieved the same or superior level of low heat build-up as that of Working Example 2.

In Table 4 above, when Comparative Example 4 and Working Examples 4 and 5 are compared, Working Example 4, in which NR (CPN+StA-modified 1) that was modified with the nitrone (A) and the fatty acid (B) was used, and Working Example 5, in which NR (CPN+StA-modified 3) was used, resulted in smaller values of tan δ (60° C.) and thus had superior low heat build-up compared to Comparative Example 4 which used NR, which was an unmodified polymer.

Furthermore, when Comparative Example 5 and Working Examples 6 and 7 are compared, Working Example 6, in which IR (CPN+StA-modified 1) that was modified with the nitrone (A) and the fatty acid (B) was used, and Working Example 7, in which IR (CPN+StA-modified 3) was used, resulted in smaller values of tan δ (60° C.) and thus had superior low heat build-up compared to Comparative Example 5 that used IR, which was an unmodified polymer.

Note that, in Comparative Examples 1 to 3, stearic acid, which was the fatty acid (B), was blended during the preparation process of the rubber compositions, excellent low heat build-up exhibited by Working Examples 1 to 3 was not achieved.

This applies the same for the relationship of Comparative Example 4 and Working Examples 4 and 5 as well as for the relationship of Comparative Example 5 and Working Examples 6 and 7.

Therefore, the effect of the present invention can be achieved by using the fatty acid (B) in combination with the nitrone (A) when the unmodified polymer (BR and/or SBR) is modified with the nitrone (A), and the effect of the present invention is a significant effect that cannot be achieved when the fatty acid (B) is added after such modification.

The invention claimed is:

1. A polymer modifying agent composition that modifies a polymer having a carbon-carbon unsaturated bond,
the polymer modifying agent composition comprising:
(A) a nitrone having at least one carboxy group; and
(B) a fatty acid having 6 or more carbons.

2. The polymer modifying agent composition according to claim 1, wherein the nitrone (A) is a nitrone represented by Formula (a):

[Chemical Formula 1]

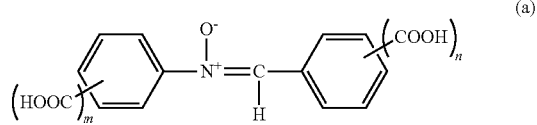

(a)

wherein, m and n each independently represent an integer of 0 to 5, and a sum of m and n is 1 or greater.

3. The polymer modifying agent composition according to claim 2, wherein the nitrone (A) is at least one type of nitrone selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

4. A modified polymer obtained by modifying an unmodified polymer with the polymer modifying agent composition described in claim 1.

5. The modified polymer according to claim 4, wherein the unmodified polymer is a diene-based rubber component.

6. The modified polymer according to claim 5, wherein the diene-based rubber component is at least one type selected from the group consisting of a natural rubber, isoprene rubber, styrene-butadiene rubber, and butadiene rubber.

7. A rubber composition comprising the modified polymer described in claim 4, and an additive.

* * * * *